US007317956B2

(12) United States Patent
Kosaka

(10) Patent No.: US 7,317,956 B2
(45) Date of Patent: Jan. 8, 2008

(54) INFORMATION PROCESSING APPARATUS AND DISPLAY CONTROL METHOD FOR INFORMATION PROCESSING APPARATUS

(75) Inventor: Makoto Kosaka, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 439 days.

(21) Appl. No.: 11/134,308

(22) Filed: May 23, 2005

(65) Prior Publication Data

US 2005/0268236 A1 Dec. 1, 2005

(30) Foreign Application Priority Data

May 24, 2004 (JP) ............................ 2004-153716

(51) Int. Cl.
*G05B 15/00* (2006.01)
*G06F 3/00* (2006.01)

(52) U.S. Cl. ........................................ 700/83; 715/718

(58) Field of Classification Search .................. 700/83
See application file for complete search history.

(56) References Cited

U.S. PATENT DOCUMENTS

| | | | | |
|---|---|---|---|---|
| 6,400,377 | B1 * | 6/2002 | Hiraka et al. | 715/716 |
| 6,519,511 | B1 * | 2/2003 | Oberschachtsiek et al. | 701/1 |
| 6,870,469 | B2 * | 3/2005 | Ueda | 340/438 |
| 2002/0101334 | A1 * | 8/2002 | Ueda | 340/425.5 |
| 2002/0140720 | A1 * | 10/2002 | Uno et al. | 345/716 |
| 2003/0169286 | A1 * | 9/2003 | Misawa | 345/716 |
| 2003/0216089 | A1 * | 11/2003 | Uryu | 439/894 |
| 2004/0015268 | A1 * | 1/2004 | Kato et al. | 700/275 |
| 2004/0201583 | A1 * | 10/2004 | Burroughes et al. | 345/211 |
| 2005/0159826 | A1 * | 7/2005 | Tanaka et al. | 700/83 |

FOREIGN PATENT DOCUMENTS

| | | |
|---|---|---|
| JP | 2003-195844 | 7/2003 |

* cited by examiner

*Primary Examiner*—Thomas K. Pham
(74) *Attorney, Agent, or Firm*—Finnegan, Henderson, Farabow, Garrett & Dunner, L.L.P.

(57) ABSTRACT

Every time a display select button is operated, an embedded controller/keyboard controller switches and controls a display select switch to switch between display data (internally processed data) for LCD display that is output from the first display controller, and display data (externally input data or processed internally processing data) for the LCD display that is output from a second display controller. The selected data is displayed on a display.

20 Claims, 7 Drawing Sheets

| Display mode | Second display controller<br>○ = Valid | P1 | P2 | Display select switch Q1 | Q2 |
|---|---|---|---|---|---|
| (A) | Inactive | × | × | ○ | × |
| (B) | Active | ○ | × | × | ○ |
| (C) | Active | × | ○ | × | ○ |

Switch by software

Switch by button operation

FIG. 4

INFORMATION PROCESSING APPARATUS AND DISPLAY CONTROL METHOD FOR INFORMATION PROCESSING APPARATUS

CROSS-REFERENCE TO RELATED APPLICATIONS

This application is based upon and claims the benefit of priority from prior Japanese Patent Application No. 2004-153716, filed May 24, 2004, the entire contents of which are incorporated herein by reference.

BACKGROUND OF THE INVENTION

1. Field of the Invention

The present invention relates to an information processing apparatus having a display function and a display control method for the information processing apparatus.

2. Description of the Related Art

In recent years, as described in, e.g., Jpn. Pat. Appln. KOKAI Publication No. 2003-195844, personal computers with an AV data appreciation function have prevailed. This AV data appreciation function allows the user to appreciate program data such as externally provided television (TV) broadcasting, and various kinds of audio/visual (AV) data such as moving image data provided by an external video playback apparatus.

The personal computer of this type has a system configuration which drives and controls the AV data appreciation function under the management and control of the operating system (OS), and a system configuration which independently activates the AV function without activating the OS.

In the system configuration which drives and controls the AV data appreciation function under the OS control, the user must wait until activation of the OS is completed when intending to appreciate AV data. In the system configuration which independently activates the AV function without activating the OS, independent operation of the AV function makes the arrangement of the entire apparatus complex and economically disadvantageous.

In any of the above-described system configurations, when implementing a display control function of performing processes for, e.g., improving the quality of an internally processed image, a display is connected to a display controller which controls this display, via a display control means for performing processes for improving the image quality. However, in this configuration, when the image data generated by the display controller is to be displayed on the display without the mediacy of the display control means for performing processes for improving the image quality, a setting means is required to cause all the functions of the display control means to be invalid. Therefore, this control becomes complex. In these system configurations, the user cannot arbitrarily switch by simple operation between a display environment in which externally input video data is appreciated and a processing work environment accompanying data display including a CPU process.

BRIEF SUMMARY OF THE INVENTION

An information processing apparatus of the present invention comprises a display, a first display controller and a second display controller which control the display, a first path which outputs display data processed by the first display controller to the display without going through the second display controller, a second path which outputs the display data processed by the first display controller to the display after a process by the second display controller, and a select controller which switches between the first path and the second path, and switches the display data to be displayed on the display.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a view for explaining an example of the path arrangement and path select process according to the embodiment;

DETAILED DESCRIPTION OF THE INVENTION

An embodiment of the present invention will be described hereinafter with reference to several views of the accompanying drawing.

An information processing apparatus according to the embodiment of the present invention will be explained with reference to FIG. 1. The information processing apparatus is implemented as, e.g., a notebook type personal computer.

Figure 1:
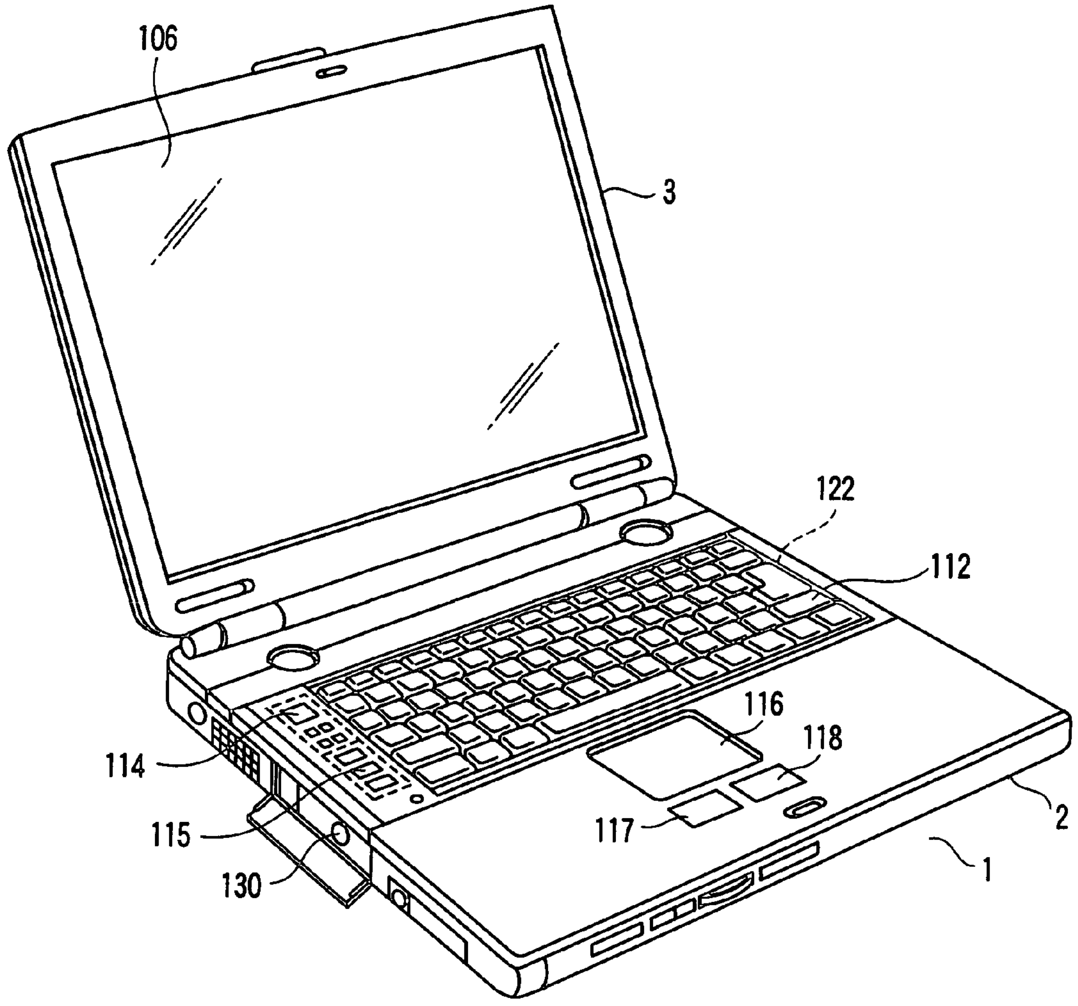
FIG. 1 is a perspective view showing an example of the external appearance of an information processing apparatus according to an embodiment of the present invention.

FIG. 1 is a front view showing an example of a state in which a display unit 3 of an information processing apparatus 1 is open with respect to an apparatus main body 2. The information processing apparatus 1 comprises the apparatus main body 2 and display unit 3. A display 106 using an LCD (Liquid Crystal Display) is built in nearly the center of the display unit 3 so that its display surface is exposed. The display unit 3 is attached to the apparatus main body 2 to be pivotal between the open and close positions.

The apparatus main body 2 has a box shape, and the side surface of the apparatus main body 2 is provided with, e.g., the medium insertion/removal port of a DVD player 122 incorporated in the apparatus main body 2, and a video input terminal (composite signal input terminal) 130 which can input an external video signal. The side surface of the apparatus main body 2 is further provided with a USB connector, video output connector, IEEE1394 connector, PC card slot, SD card slot, and the like though the reference symbols of these components are not shown. The upper surface of the apparatus main body 2 is provided with a keyboard unit 112, a power button 114 used to turn on/off the power supply of the information processing apparatus 1, a display select button 115 used to switch display data to be displayed on the display 106 (switch the path and display mode), and the like. The display select button 115 is operated every time display of data internally processed within the apparatus and display of data (video data generated from a composite signal) externally input to the video input terminal 130 are switched and displayed on the display 106. The upper surface of the apparatus main body 2 is also provided with a loudspeaker (not shown), a touchpad 116 having the scroll function of a mouse, a left button 117 serving as the left click function of a mouse, a right button 118 serving as the right click function of a mouse, and the like. The front surface of the apparatus main body 2 is provided with an AV playback switch which designates playback of AV contents stored in a medium (disk) set in the DVD player 122 incorporated in the apparatus main body 2, a volume dial, and the like though the reference symbols of these components are not shown.

Figure 2:
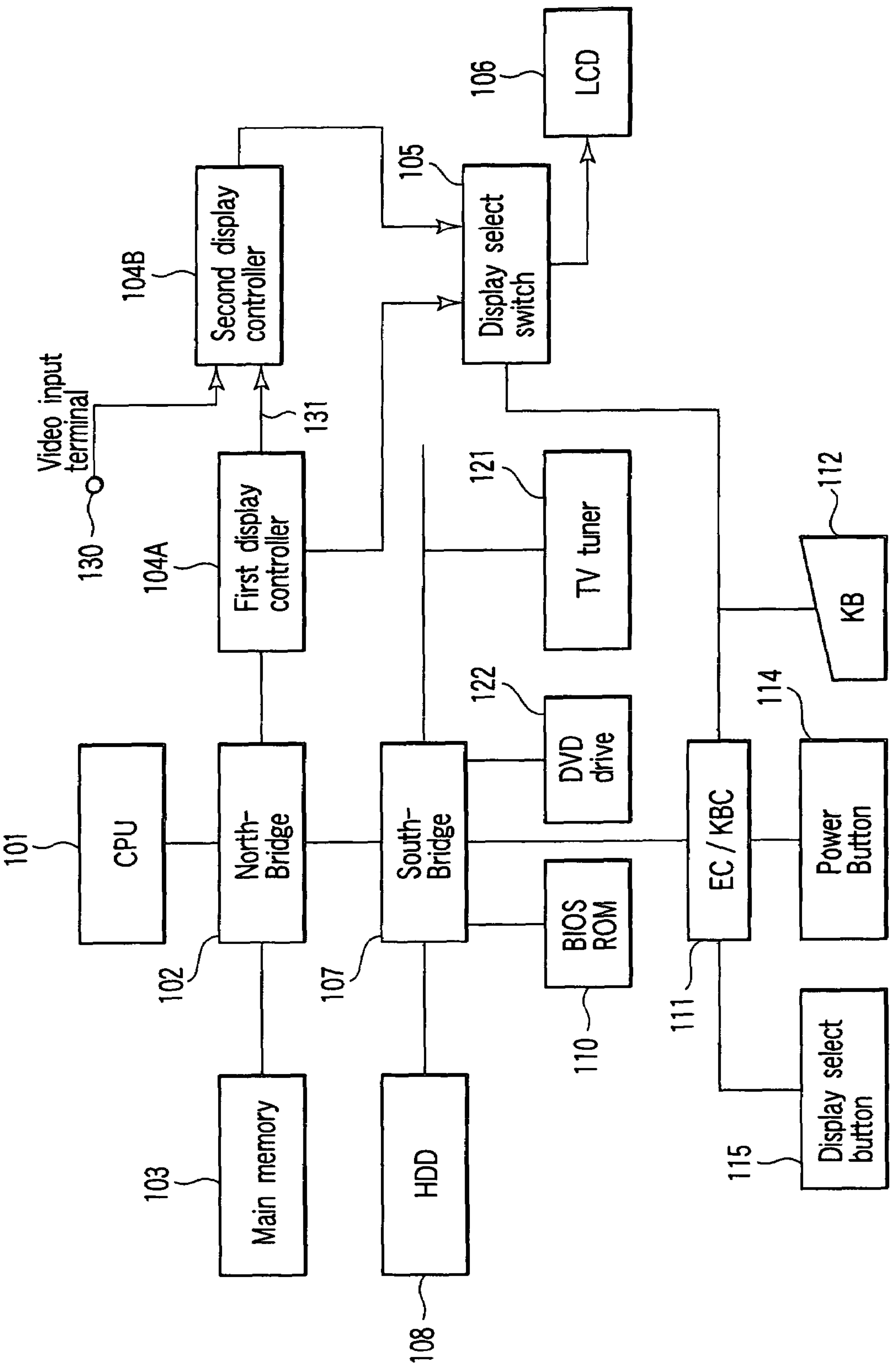
FIG. 2 is a block diagram showing an example of the internal arrangement of the information processing apparatus according to the embodiment.

An example of the system configuration of the information processing apparatus 1 according to the embodiment of the present invention will be described below with reference to FIG. 2.

The information processing apparatus 1 comprises various building components such as a CPU 101, a north-bridge 102 and south-bridge 107, a main memory 103, a first display controller 104A, a second display controller 104B, a display select switch 105, the display (LCD) 106, a hard disk drive (HDD) 108, a BIOS-ROM 110, an embedded controller/keyboard controller (EC/KBC) 111, the keyboard unit (KB) 112, the power button 114, the display select button 115, a television (TV) tuner 121, the DVD player 122, and the video input terminal (composite signal input terminal) 130.

The CPU 101 is a processor adopted to control the operation of the information processing apparatus according to the embodiment. The CPU 101 executes an operating system (OS) and various applications/utility programs loaded from the hard disk drive 108 serving as an external storage device onto the main memory 103 via the south-bridge 107 and north-bridge 102. The CPU 101 also executes a BIOS (Basic Input Output System) stored in the BIOS-ROM 110.

The north-bridge 102 is a bridge device which connects the CPU 101 to the south-bridge 107. The north-bridge 102 incorporates a memory controller (not shown) which controls access to the main memory 103. The north-bridge 102 is connected to the first display controller 104A.

The main memory 103 stores the operating system (OS), various application programs, utility programs, a display driver acting as an interface between these applications and the BIOS, and the like, which are to be executed by the CPU 101. The main memory 103 stores various programs: for example, for display of data (video data generated from a composite signal) externally input to the video input terminal 130, a utility program which sets automatic/manual select of the display and functions part of the user interface of the information processing apparatus according to the embodiment, and for display (e.g., display in the full-screen mode of DVD images) under predetermined setting conditions, a control program which implements settings, a control function accompanying the settings, and the like when a display image processed by the first display controller 104A undergoes processes in display (e.g., image processes for higher quality such as ghost reducer, noise reduction, 10-bit A/D conversion, 3D Y/C separation, time-base corrector, digital sharpness, digital overdrive, deblocking, interlace/progressive conversion, color correction, deringing, black enhancer, white enhancer, edge enhancer, and dynamic contrast adjustment) set in advance by the second display controller 104B and output to the display 106.

The first display controller 104A controls display and output of data (internally processed data) which is internally processed by the CPU 101 and is to be displayed on the display 106. The first display controller 104A is connected to the second display controller 104B via a dedicated signal line 131.

The second display controller 104B has a processing function for performing processes (image processes for higher quality) such as ghost reducer, noise reduction, 10-bit A/D conversion, 3D Y/C separation, time-base corrector, digital sharpness, digital overdrive, deblocking, interlace/progressive conversion, color correction, deringing, black enhancer, white enhancer, edge enhancer, and dynamic contrast adjustment described above for display data received from the first display controller 104A via the dedicated signal line 131 and outputting the processed data, and a processing function for converting an external video signal (composite signal) input to the video input terminal 130 into display data for LCD display and outputting the converted data. The second display controller 104B also has a processing function for, when a video signal (composite signal) is externally input to the video input terminal 130, detecting the signal input, converting the input video signal (composite signal) into display data for LCD display, and outputting the converted data. The second display controller 104B further has a function for notifying the embedded controller/keyboard controller 111 via the BIOS of the detected state of the signal input. In addition, the second display controller 104B has a function for, when input of an external video signal (composite signal) is detected while display data (internally processed data) received from the first display controller 104A undergoes a predetermined process (image process for higher quality) and is output, converting the video signal (composite signal) input to the video input terminal 130 into display data for LCD display and outputting the converted data preferentially to the internally processed data. Valid/invalid setting of this function is performed by the utility program which sets automatic/manual select for display of externally input data, as described above. When automatic select is set by setting of automatic/manual select, the display select switch 105 is switched by a display select control signal generated by the embedded controller/keyboard controller 111 upon detection of the externally input signal.

Display data (internally processed data) for LCD display that is output from the first display controller 104A and display data (externally input data or internally processed data having undergone a process) for LCD display that is output from the second display controller 104B are input to the display select switch 105.

The display select switch 105 selects, as a select target, either of display data (internally processed data) for LCD display that is output from the first display controller 104A and display data (externally input data or internally processed data having undergone a process) for LCD display that is output from the second display controller 104B in accordance with a display select control signal generated by the embedded controller/keyboard controller 111, and supplies the selected display data to the display 106. The display select control signal generated by the EC/KBC 111 will be described later. The display 106 displays the display data supplied from the display select switch 105.

The input select of the display select switch 105 implements a function for selecting, as a target, one of a path which outputs display data processed by the first display controller 104A to the display 106 without the mediacy of the second display controller 104B, a path which processes by the second display controller 104B display data processed by the first display controller 104A and outputs the processed data to the display 106, and a path which converts a video signal (composite signal) input to the video input terminal 130 into display data for LCD display by the second display controller 104B and outputs the display data to the display 106. The path and path select control at this time will be described later with reference to FIGS. 3 and 4. The display 106 displays display data supplied from the display select switch 105.

The south-bridge 107 is a bridge device connected to the north-bridge 102. The south-bridge 107 is connected to the hard disk drive (HDD) 108, BIOS-ROM 110, embedded controller/keyboard controller 111, television (TV) tuner 121, DVD player 122, and the like.

The hard disk drive (HDD) 108 stores the OS, device drivers, application programs to be executed, data generated upon execution of the application programs, and the like. Pieces of data stored in the hard disk drive (HDD) 108 are transferred to the main memory 103 as needed for a program process of the CPU 101, and undergo the processing of the CPU 101.

The BIOS-ROM 110 stores a BIOS executed by the CPU 101. The display control routine of the BIOS includes a processing step of acquiring (loading) setting data on automatic/manual select of externally input display (external monitor display) that is set by the above-described utility program and sets whether to switch the display manually or automatically for data (composite signal) externally input to the video input terminal 130, and a processing step of notifying the embedded controller/keyboard controller 111 of the acquired setting contents of automatic/manual select.

The embedded controller/keyboard controller 111 is a 1-chip microcomputer which integrates an embedded controller that controls peripheral function circuits including power management, and a keyboard controller that controls the keyboard unit 112. The embedded controller/keyboard controller 111 is connected to the display select switch 105 and display select button 115 serving as building components which implement the display select control according to the present invention, in addition to building components such as the keyboard unit 112 and a power button 114. The embedded controller/keyboard controller 111 switches and controls the display select switch 105 on the basis of setting data of automatic/manual select notified from the BIOS, and the operation signal of the display select button 115. For example, the display select switch 105 selects display data (internally processed data) for LCD display that is output from the first display controller 104A, and the internally processed data is displayed on the display 106. At this time, if a detection signal representing that a video signal (composite signal) has been input to the video input terminal 130 is received from the second display controller 104B, whether the setting contents of automatic/manual select notified from the BIOS represent automatic select or manual select is checked. For automatic select, the display select button 115 is switched and controlled by the display select control signal to output from the display 106 display data (externally input data) for LCD display that is output from the second display controller 104B, instead of display data (internally processed data) for LCD display that is output from the first display controller 104A. When the setting contents represent manual select, the display is not switched at the signal detection timing, and the display select switch 105 is switched and controlled in accordance with the operation signal of the display select button 115 every time the button is operated. Display data (internally processed data) for LCD display that is output from the first display controller 104A and display data (externally input data or internally processed data having undergone a process) for LCD display that is output from the second display controller 104B are switched and displayed on the display 106.

The display select process at this time will be described later with reference to the flowcharts shown in FIGS. 5 and 7.

The embedded controller/keyboard controller 111 powers on/off the information processing apparatus 1 in accordance with an operation of the power button 114 by the user. The power button 114 is adopted to control power supply to devices such as the CPU 101 and main memory 103 which constitute the information processing apparatus 1, and then activate the OS. When the user presses the power button 114, these devices are powered on, and then the CPU 101 executes the system activation process routine of a BIOS installed in the BIOS-ROM 110, thereby activating the OS. When the CPU 101 executes an initialization process routine, the result of, e.g., POST (Power On Self Test) in the initialization process routine is displayed on the display 106.

The TV tuner 121 is connected to the south-bridge 107 via, e.g., a USB interface. The TV tuner 121 receives TV broadcasting program data (contents) of a channel requested for viewing by a personal computer or the like via a remote controller or LAN (not shown). The TV broadcasting program data is converted into compressed/coded TV broadcasting program data via an internal NTSC decoder and MPEG encoder. When the user is to view TV broadcasting program data, compressed/coded TV program data is decoded by an internal MPEG decoder, and the decoded TV program data is displayed on the display 106. When TV broadcasting program data is to be video-recorded, TV broadcasting program data compressed and coded by the MPEG encoder is stored in the hard disk drive (HDD) 108. The DVD player 122 connected to the south-bridge 107 performs, e.g., playback of contents recorded on a set (loaded) DVD disk.

Figure 3:
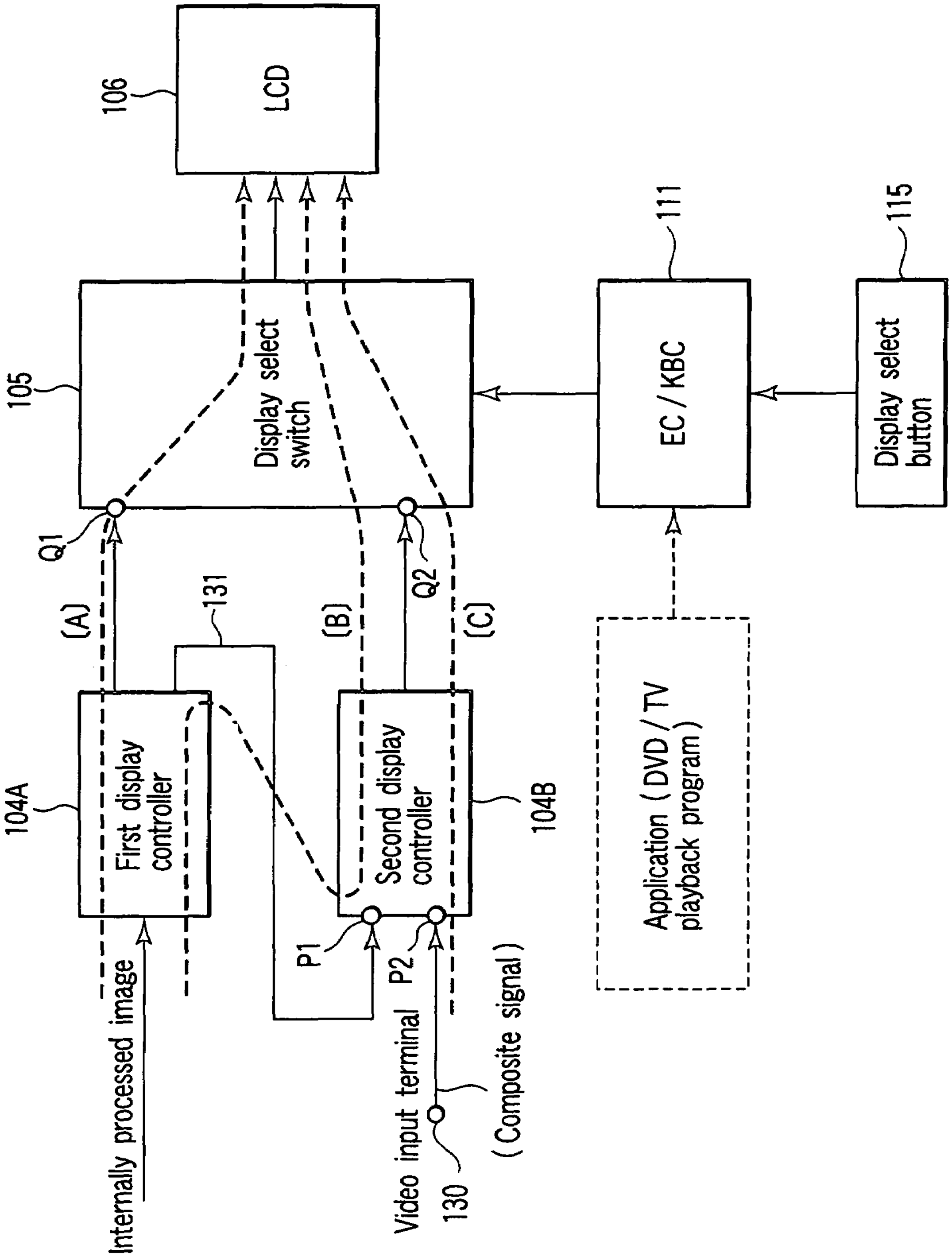
FIG. 3 is a view for explaining an example of a path arrangement and path select process according to the embodiment.

With reference to FIGS. 3 and 4, the path arrangement and path select process will be described below. FIG. 3 shows three paths serving as display select control targets according to the above-described embodiment of the present invention. FIG. 4 shows the states of each device included in the paths.

Note that a path which outputs display data processed by the first display controller 104A to the display 106 without the mediacy of the second display controller 104B is called a path [A], a path which processes by the second display controller 104B display data processed by the first display controller 104A and outputs the processed data to the display 106 is called a path [B], and a path which converts a video signal (composite signal) input to the video input terminal 130 into display data for LCD display by the second display controller 104B and outputs the display data to the display 106 is called a path [C]. Also, a display process by the path [A] is called a display mode [A], a display process by the path [B] is called a display mode [B], and a display process by the path [C] is called a display mode [C]. As shown in FIG. 4, the embedded controller/keyboard controller 111 executes this display mode select (path select) process by switching and controlling the active/inactive states and input ports (P1 and P2) of the second display controller 104B, and also switching and controlling input ports (Q1 and Q2) of the display select switch 105. Assume that the path [A] is selected. The input port Q1 is valid (switch on), and the input port Q2 is invalid (switch off) in the display select switch 105, and the second display controller 104B is in an inactive state. Accordingly, the display data output from the first display controller 104A is directly output to the display 106 via the input port (Q1) and output port of the display select switch 105, without the mediacy of the second display controller 104B. Assume that the path [B] is selected. The input port Q1 is invalid, and the input port Q2 is valid in the display select switch 105, the second display controller 104B is in an active state, and the input port P1 is valid, and the input port P2 is invalid in the second display controller 104B. Accordingly, the display data from the first display controller 104A is output to the display 106 via the second display controller 104B and the input port (Q2) and output port of the display select switch 105. Assume that the path [C] is selected. The input port Q1 is invalid, and the input port Q2 is valid in the display select switch 105, the second display controller 104B is in the active state, and the input port P1 is invalid, and the input port P2 is valid in the second display controller 104B. Accordingly, a video signal (composite signal) input to the video input terminal 130 is converted into display data for LCD display by the second display controller 104B, and output to the display 106 via the input port (Q2) and the output port of the display select switch 105.

As described above, in accordance with the display select control signal generated by the embedded controller/keyboard controller 111, the display select switch 105 switches the paths. One of display data (internally processed data) for LCD display that is output from the first display controller 104A and display data (externally input data or internally processed data having undergone a process) for LCD display that is output from the second display controller 104B is selected and output to the display 106 as a select target. Note that the display modes [A] and [B] are switched by control of the embedded controller/keyboard controller 111 via the BIOS in accordance with a select instruction from an application (software) based on, e.g., a user's instruction. An example of this process will be described later with reference to the flowchart shown in FIG. 5.

Figure 5:
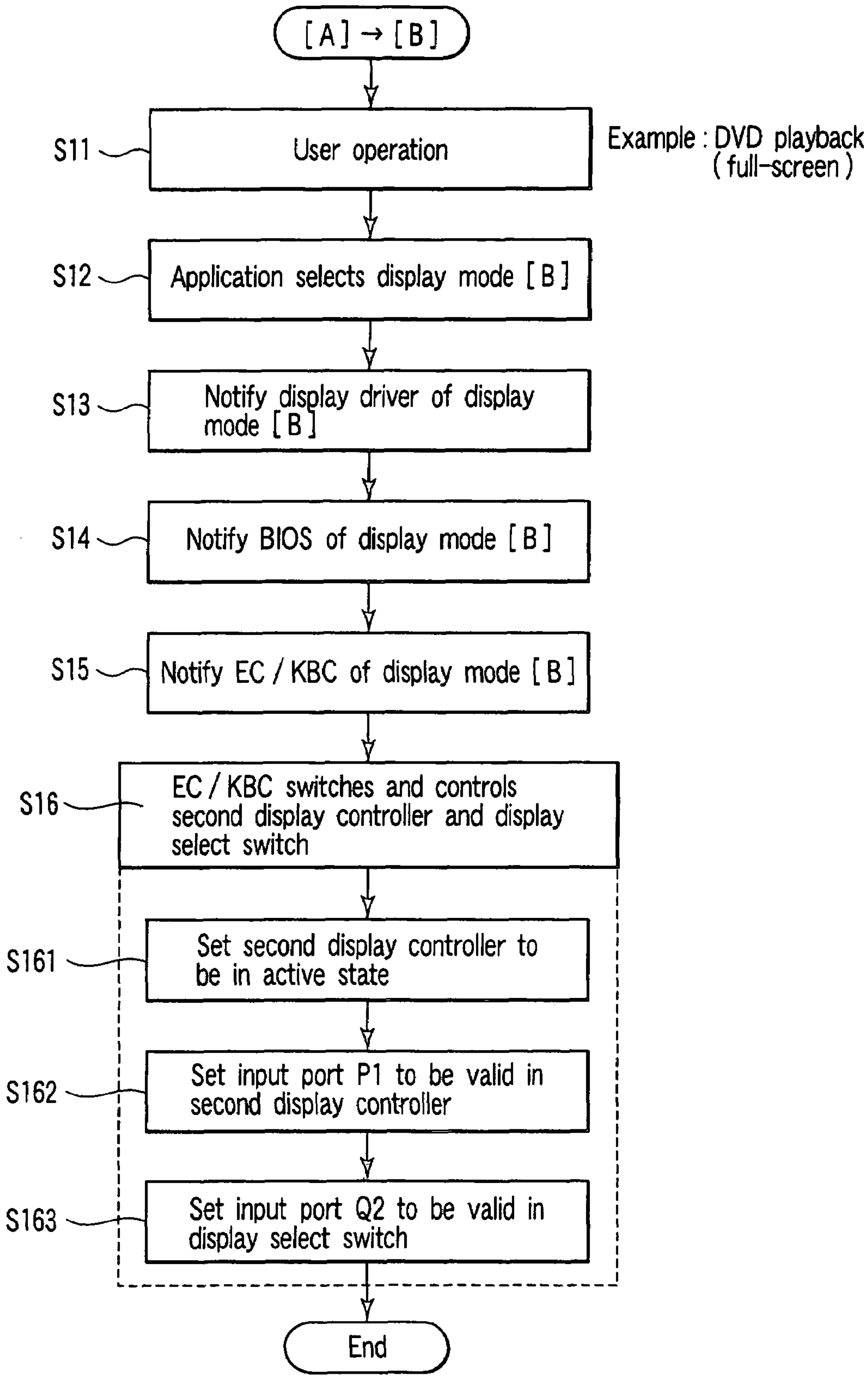
FIG. 5 is a flowchart showing an example of the select processing procedure of a path and display mode according to the embodiment.
Figure 6:
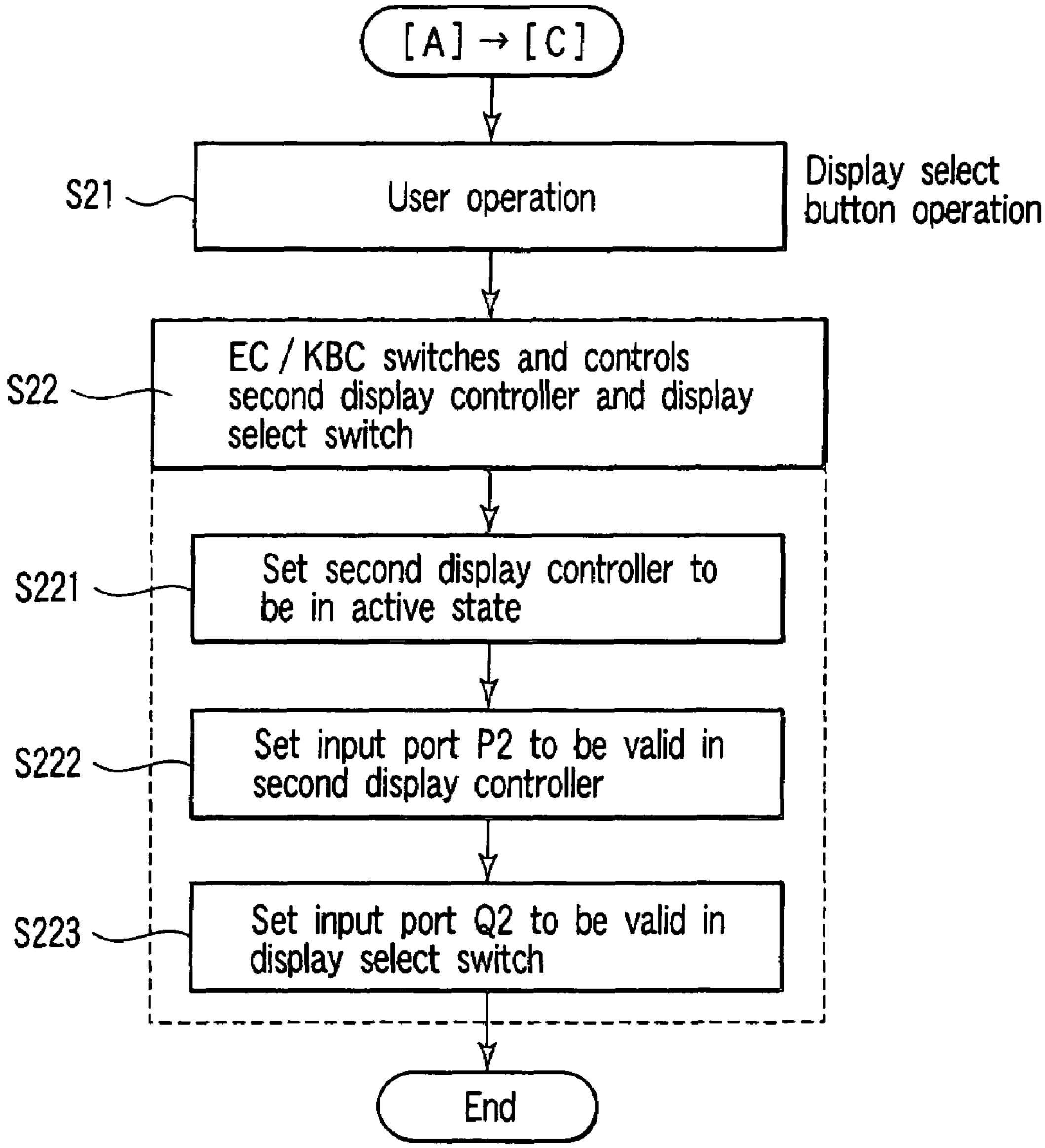
FIG. 6 is a flowchart showing an example of the select processing procedure of the path and display mode according to the embodiment.
Figure 7:
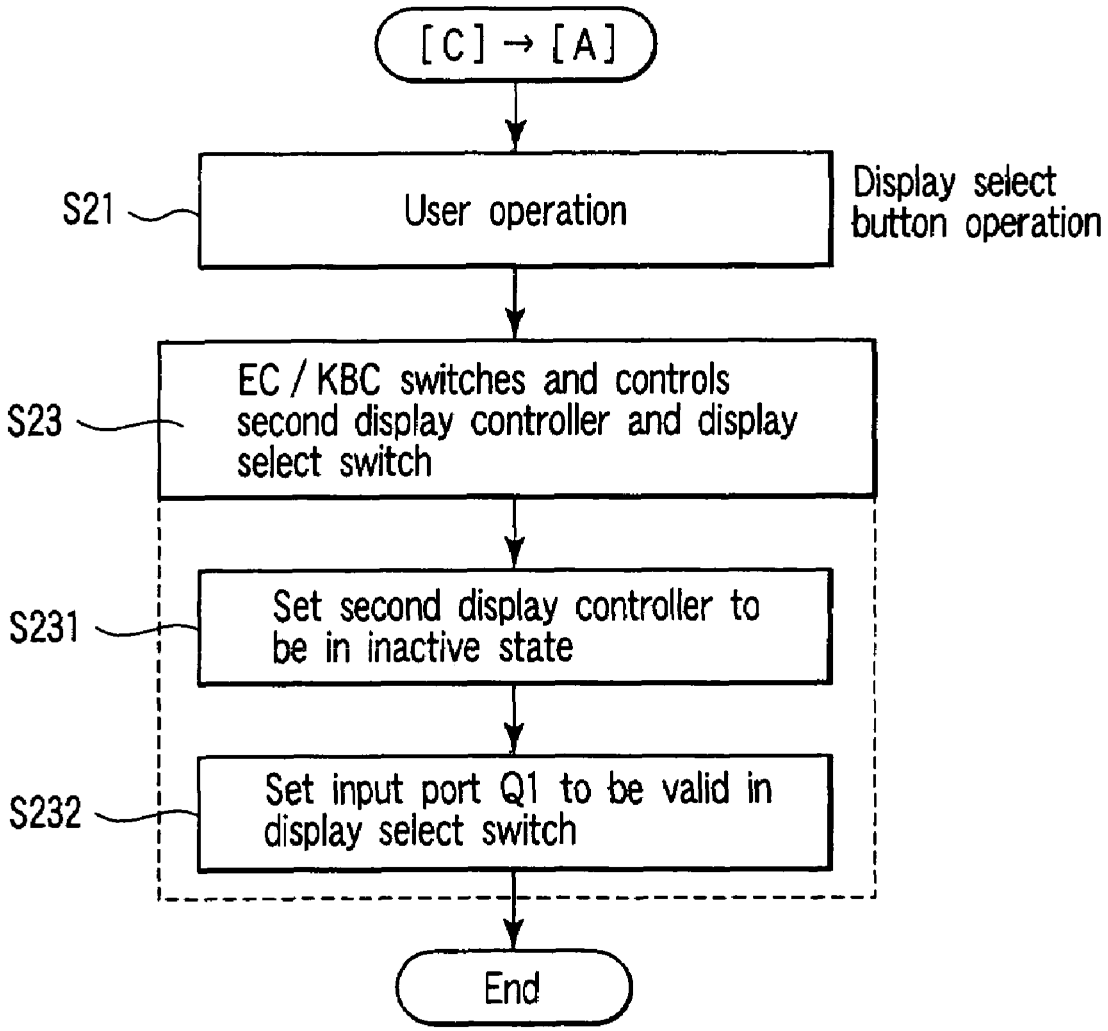
FIG. 7 is a flowchart showing an example of the select processing procedure of the path and display mode according to the embodiment.

FIGS. 5 to 7 are flowcharts of the select processing procedures of the above-described display modes (paths).

FIG. 5 shows the procedures of the process of switching the display mode (path) from [A] to [B]. In the display mode [A], for example, an operation window accompanying data display including a CPU 101 process for a proper processing work of a PC, such as a text input process or editing process is displayed on the display 106. In this case, the input port Q1 is valid, and the input port Q2 is invalid in the display select switch 105, and the second display controller 104B is in the inactive state.

Assume that the user sets a medium (playback disk) for appreciating the cinema into a DVD player 122, and instructs to play back the DVD in a full-screen mode. A DVD playback application (DVD playback program) interprets the condition of the user's instruction, and notifies the BIOS of the select instruction of the display mode (i.e., display mode [B]) for improving the image quality, via the display driver (steps S11 to S14 shown in FIG. 5).

The BIOS then notifies the embedded controller/keyboard controller 111 of the select instruction of the display mode [B] in accordance with the contents of the notification received via the display driver (step S15 shown in FIG. 5).

In accordance with the select instruction received from the BIOS, the embedded controller/keyboard controller 111 switches and controls the second display controller 104B and the display select switch 105 to switch the display mode (path) from [A] to [B] (step S16 shown in FIG. 5). The embedded controller/keyboard controller 111 executes this display mode select process such that the input port Q1 is invalid, and the input port Q2 is valid in the display select switch 105, the second display controller 104B is in the active state, and the input port P1 is valid, and the input port P2 is invalid in the second display controller 104B (steps S161 to S163 shown in FIG. 5). Since this select process has been described with reference to FIGS. 3 and 4, a description thereof will be omitted.

As described above, when the user instructs to end or stop playback in the display mode [B], the embedded controller/keyboard controller 111 is notified of the instruction via the steps S11 to S15 shown in FIG. 5. The embedded controller/keyboard controller 111 switches and controls the display mode from [B] to [A].

The above-described display select process is performed by the embedded controller/keyboard controller 111 in accordance with the notification from the BIOS (application).

Next, the procedures of the display select process performed using a display select button 115 by the embedded controller/keyboard controller 111 will be described below.

When the display select button 115 is operated in the display mode [B], the embedded controller/keyboard controller 111 switches the input port from P1 to P2, or from P2 to P1 to be valid in the second display controller 104B, every time the notification is received from the display select button 115. With this process, the display mode is switched from [B] to [C], or from [C] to [B].

Next, the process of switching between the display modes [A] and [C] will be described.

FIG. 6 shows the procedures of the process of switching the display mode (path) from [A] to [C]. In this case, when the user operates the display select button 115 in the display mode (path) [A], the embedded controller/keyboard controller 111 is notified of the operation of this display select button 115 (step S21 shown in FIG. 6).

When receiving the notification of the instruction to switch the display using the display select button 115 in the display mode [A], the embedded controller/keyboard controller 111 switches and controls the second display controller 104B and the display select switch 105 in the following steps (step S22). That is, the EC/KBC 111 switches the second display controller 104B from the inactive state to the active state (S221), switches the input port from P1 to P2 to be valid in accordance with the notification from the BIOS (S222), and switches the input port from Q1 to Q2 to be valid in the display select switch 105 (S223). Accordingly, the display mode is switched from [A]to [C].

FIG. 7 shows the procedures of the process of switching the display mode (path) from [C] to [A]. In this case, when the user operates the display select button 115 in the display mode (path) [C], the embedded controller/keyboard controller 111 is notified of the operation of this display select button 115 (as in step S21 shown in FIG. 6).

When receiving the notification of the instruction to switch the display using the display select button 115 in the display mode [C], the embedded controller/keyboard controller 111 switches and controls the second display controller 104B and the display select switch 105 in the following steps (step S23). That is, the EC/KBC 111 switches the second display controller 104B from the active state to the inactive state (S231), and then switches the input port from Q2 to Q1 to be valid in the display select switch 105 (S232).

Thus, in the configuration including the second display controller 104B with an image quality improving function in addition to the first display controller 104A which displays the internally processed data on the display 106, the display path and display mode applied to the contents of the display data can be arbitrary selected by, e.g., a user's operation. Hence, an optimum display process can be implemented in accordance with various display environments such as a work display environment accompanying data display including a process of the CPU 101 within the apparatus, a display environment in which internally processed video data is appreciated, and a display environment in which externally input video data is appreciated. Since the display path including the external input terminal 130 of the second display controller 104B with a function of improving the image quality can be separated from the bus arrangement and the remaining display path within the apparatus, a copyguard function can be improved. In addition to this, since the active/inactive states of the second display controller 104B with the function of improving the image quality can be controlled in accordance with the selected display path, power consumption can be saved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:

a display;

a first display controller and a second display controller;

a first path which outputs display data processed by the first display controller to the display without going through the second display controller;

a second path which outputs the display data processed by the first display controller to the display after a process by the second display controller; and a select controller which switches between the first path and the second path to switch the display data to be displayed on the display.

2. The apparatus according to claim 1, further comprising an external input terminal configured to receive an externally supplied video signal, and a third path which converts the video signal input to the external input terminal into the display data configured to be displayed on the display by the second controller, and outputs the converted signal to the display, wherein the select controller switches between the paths including the third path.

3. The apparatus according to claim 2, wherein the select controller further comprises a selector which selects the third path upon recognizing the input state when the video signal is input to the external input terminal.

4. The apparatus according to claim 3, wherein the select controller further comprises an operation switch which switches between the paths, and a path select controller which switches between a path going through the first display controller and a path without going through the first display controller, every time the operation switch is operated.

5. The apparatus according to claim 4, wherein the select controller comprises a mode selector which selects one of an automatic select mode in which when the video signal is input to the external input terminal, the state is recognized to select the third path, and a manual select mode in which switching is performed using the operation switch to select the third path.

6. The apparatus according to claim 2, wherein the select controller further comprises an operation switch which switches between the paths, and a path select controller which switches between a path going through the first display controller and a path without going through the first display controller, every time the operation switch is operated.

7. The apparatus according to claim 6, wherein the select controller comprises a mode selector which selects one of an automatic select mode in which when the video signal is input to the external input terminal, the state is recognized to select the third path, and a manual select mode in which switching is performed using the operation switch to select the third path.

8. The apparatus according to claim 1, wherein the select controller further comprises a state select controller which causes the second display controller to be in an inactive state when the first path is selected.

9. The apparatus according to claim 1, wherein the select controller further comprises a path selector which selects the second path on the basis of a predetermined condition when a video apparatus connected to the first display controller via a bus bridge serves as a control target, and output data from the video apparatus is displayed on the display.

10. A display control method of an information processing apparatus including a display, and a first display controller and a second display controller which control the display, comprising:

switching display data displayed on the display, by switching between a first display mode in which display data processed by the first display controller is displayed on the display without going through the second display controller, and a second display mode in which the display data processed by the first display controller is processed by the second display controller to display the processed display data on the display.

11. The method according to claim 10, wherein the information processing apparatus further comprises an external input terminal configured to receive an externally supplied video signal, and further includes a third display mode in which the video signal input to the external input terminal is converted into the display data configured to be displayed on the display by the second display controller to display the converted signal on the display, and the display data displayed on the display is switched by switching the display modes.

12. The method according to claim 11, further comprising, when the video signal is input to the external input terminal, a control step of selecting the third display mode upon recognizing the input state.

13. The method according to claim 12, in which the information processing apparatus further comprises an operation switch which switches the display mode, and which comprises a control step of switching between a display mode in which the display data is displayed on the display going through the first display controller and a display mode in which the display data is displayed on the display without going through the first display controller, every time the operation switch is operated.

14. The method according to claim 13, further comprising a step of setting an automatic select mode in which when the video signal is input to the external input terminal, the state is recognized to select the third display mode, and a manual select mode in which the third display mode is selected using the operation switch, to switch the display modes in accordance with the setting.

15. The method according to claim 11, in which the information processing apparatus further comprises an operation switch which switches the display mode, and which comprises a control step of switching between a display mode in which the display data is displayed on the display going through the first display controller and a display mode in which the display data is displayed on the display without going through the first display controller, every time the operation switch is operated.

16. The method according to claim 15, further comprising a step of setting an automatic select mode in which when the video signal is input to the external input terminal, the state is recognized to select the third display mode, and a manual select mode in which the third display mode is selected using the operation switch, to switch the display modes in accordance with the setting.

17. The method according to claim 10, wherein the second display controller is set in an inactive state when the first display mode is selected.

18. The method according to claim 10, in which the information processing apparatus comprises a video apparatus connected to the first display controller via a bus bridge, and which comprises a control step of selecting the second display mode on the basis of a predetermined display condition when output data from the video apparatus is displayed on the display.

19. An information processing apparatus including a CPU and a display, comprising:

a display controller which performs a display control process for displaying data including a CPU process on the display;

an image quality processing controller which performs a process for higher quality of image data to be displayed on the display;

a first path which is used to output to the display data having undergone a display control process by the display controller;

a second path which is used to supply the image data of the data having undergone the display control process by the display controller, and output to the display the image data having undergone the process for higher image quality by the image quality processing controller; and a select switch which selects one of the first path and the second path for outputting the data to the display, wherein the display displays, when the first path is selected by the select switch, the data including the CPU process, having undergone the display control process by the display controller, and displays, when the second path is selected by the select switch, the image data having undergone a process for higher image quality by the image quality processing controller.

20. The apparatus according to claim 19, which further comprises an external input terminal configured to receive an externally supplied image signal, a third path which is used to output, to the display via the image quality processing controller, the image signal input to the external input terminal, and a selector which selects the third path as a path for displaying the data on the display, when inputting the image signal to the external input terminal, and in which when the externally supplied image signal is input to the external input terminal, the selector selects the third path, the image processing controller processes the image signal for higher image quality to display the image signal on the display, the image data obtained by the process is output via the third path, and the display displays the image data obtained by processing the image signal for higher image quality by the image quality processing controller.

* * * * *